US009262134B2

(12) United States Patent
Kelapure et al.

(10) Patent No.: US 9,262,134 B2
(45) Date of Patent: Feb. 16, 2016

(54) ANALYSIS OF SOURCE CODE CHANGES (71) Applicant: International Business Machines Corporation, Armonk, NY (US)

(72) Inventors: Rohit D. Kelapure, Morrisville, NC (US); Paul Komar, Lexington, MA (US); Maneesh Mehra, Westford, MA (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 14/221,707

(22) Filed: Mar. 21, 2014

(65) Prior Publication Data

US 2015/0268939 A1 Sep. 24, 2015

(51) Int. Cl.
*G06F 9/44* (2006.01)
*G06F 9/45* (2006.01)

(52) U.S. Cl.
CPC ... *G06F 8/40* (2013.01); *G06F 8/42* (2013.01)

(58) Field of Classification Search
None
See application file for complete search history.

(56) References Cited

U.S. PATENT DOCUMENTS

| 8,209,669 | B2* | 6/2012 | Schneider et al. | 717/127 |
| 8,276,123 | B1* | 9/2012 | Deng et al. | 717/125 |
| 8,694,958 | B1* | 4/2014 | Potter et al. | 717/109 |
| 8,856,725 | B1* | 10/2014 | Anderson et al. | 717/103 |
| 2006/0143594 | A1* | 6/2006 | Grimaldi | 717/123 |
| 2008/0148245 | A1* | 6/2008 | Gutz | 717/141 |
| 2008/0209567 | A1* | 8/2008 | Lockhart et al. | 726/25 |
| 2008/0262860 | A1* | 10/2008 | Schneider et al. | 705/1 |
| 2008/0263505 | A1* | 10/2008 | StClair et al. | 717/101 |
| 2008/0295069 | A1* | 11/2008 | Nicholls et al. | 717/106 |
| 2011/0055798 | A1* | 3/2011 | Kraft et al. | 717/100 |
| 2011/0161425 | A1 | 6/2011 | Xiao et al. | |
| 2011/0219359 | A1* | 9/2011 | Gupta | 717/124 |
| 2011/0314446 | A1* | 12/2011 | Esbensen et al. | 717/110 |
| 2012/0072968 | A1* | 3/2012 | Wysopal et al. | 726/1 |
| 2012/0159434 | A1* | 6/2012 | Dang et al. | 717/120 |
| 2013/0066865 | A1 | 3/2013 | Chan et al. | |
| 2014/0115565 | A1* | 4/2014 | Abraham et al. | 717/128 |
| 2015/0082276 | A1* | 3/2015 | Balachandran | 717/112 |
| 2015/0172311 | A1* | 6/2015 | Freedman et al. | 726/1 |

OTHER PUBLICATIONS

IBM, "Using the static analysis feature for code review in Rational Application Developer Version 7.0," Dec. 4, 2007.*
Wit et al., "Managing Code Clones Using Dynamic Change Tracking and Resolution," Delft University of Technology 2009.*
Elva et al., "JSCTracker: A Tool and Algorithm for Semantic Method Clone Detection Using Method IOE-Behavior," Oct. 15, 2012.*
Tao et al., "How Do Software Engineers Understand Code Changes?—An Exploratory Study in Industry," Copyright 2012 ACM.*
Briski et al., "Minimizing code defects to improve software quality and lower development costs," Oct. 2008, IBM.*
Zhang et al., "Combined Static and Dynamic Automated Test Generation," Copyright 2011 ACM.*

(Continued)

*Primary Examiner* — Insun Kang
(74) *Attorney, Agent, or Firm* — Stephen R. Yoder (57) ABSTRACT A code base, including a code base history, is searched for code term(s) and change(s) that have been made to the code term(s). The code base includes, but is not limited to, multiple: (i) instances of code; (ii) product releases; (iii) code components; and/or (iv) code drafting projects.

20 Claims, 3 Drawing Sheets

(56) References Cited

OTHER PUBLICATIONS

Batta et al., "Hybrid Technique for Software Code Clone Detection," International Journal of Computers & Technology vol. 2 No. 2, Apr. 2012.*

Devi et al., "Detecting Software Clones Using Association Rule Mining," International Journal of Advanced Technology & Engineering Research (IJATER), vol. 3, Issue 1, Jan. 2013.*

Barbour et al., "A Technique for Just-in-Time Clone Detection in Large Scale Systems," 2010.*

Shackleford, "Integrating Security into Development, No Pain Required," SANS Institute, Sep. 2011.*

"Coccinelle: A Program Matching and Transformation Tool for Systems Code", Last modified Aug. 9, 2013, <http://coccinelle.lip6.fr/>.

* cited by examiner

ANALYSIS OF SOURCE CODE CHANGES

BACKGROUND OF THE INVENTION

The present invention relates generally to the field of source code management, and more particularly to identification of "related code segments" (that is, portions of code that are potentially related for code revision purposes). Oftentimes during software development, a developer will change a portion of a set of code associated with a computer program. Further, the set of code, or code base, may include several branches associated with various versions of the program. When making a change to a portion of code within a code base, the software developer may attempt to identify other portions of code within the code base where a similar change may be helpful.

When searching for related code segments that are similar to a given piece of code (herein referred to as a "target code segment"), then software developers typically: (i) search a code base manually in order to find related code segments that are related to the target code segment; and (ii) analyze the related code segments to determine whether each of those related code segments would benefit from the same type of change that is being proposed for the target code segment. For example, a review of one of the related code segments, which is related to the target code segment might show that the related portion had already undergone a change similar to what is currently proposed for the target code segment, but, that the related code segment had later been reverted back to a state similar to the target code segment for some reason. In that example, the reversion of the related code segment might: (i) cause the developer to question whether the currently proposed revision really would be helpful for that related code segment; and/or (ii) cause the developers to question whether the change being proposed for the target code segment would really be helpful even with respect to the target code segment.

When performing the manual searches for related code segments described in the previous paragraph, developers search change repositories for the exact words used in a code to determine whether the same change was made elsewhere. Another known technique to find related code segments is the application of an automated, static analysis rule using exact words or phrases (also known as a code snippet) that are searched over the entire code base.

Some known software development systems provide for an integrated development environment (IDE) that notifies the developer in real-time, as a piece of code is being written, that there is already a piece of code in a repository that includes the exact words or phrases being written by using a static analysis of the code language. Some IDEs notify the user that another version of the edited file had been modified using the exact words or phrases found in the edited file by applying those exact words or phrases in a static analysis of the other version.

SUMMARY

A method for analysis of source code changes including: receiving a static analysis rule and a corresponding dynamic analysis rule associated with a first proposed code change to a first code segment; applying the static analysis rule to a code set to identify a set of code segment(s) of potential interest; and applying the dynamic analysis rule to code segments within the set of code segment(s) of potential interest to identify a set of code segment(s) of interest that are related to the first code segment with respect to the advisability of making the first proposed code change in at least one of the following places: (i) the first code segment, and/or (ii) at least one of the code segment(s) of potential interest.

DETAILED DESCRIPTION

A code base, including a code base history, is searched for code term(s) and change(s) that have been made to the code term(s). The code base includes, but is not limited to, multiple: (i) instances of code; (ii) product releases; (iii) code components; and/or (iv) code drafting projects. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
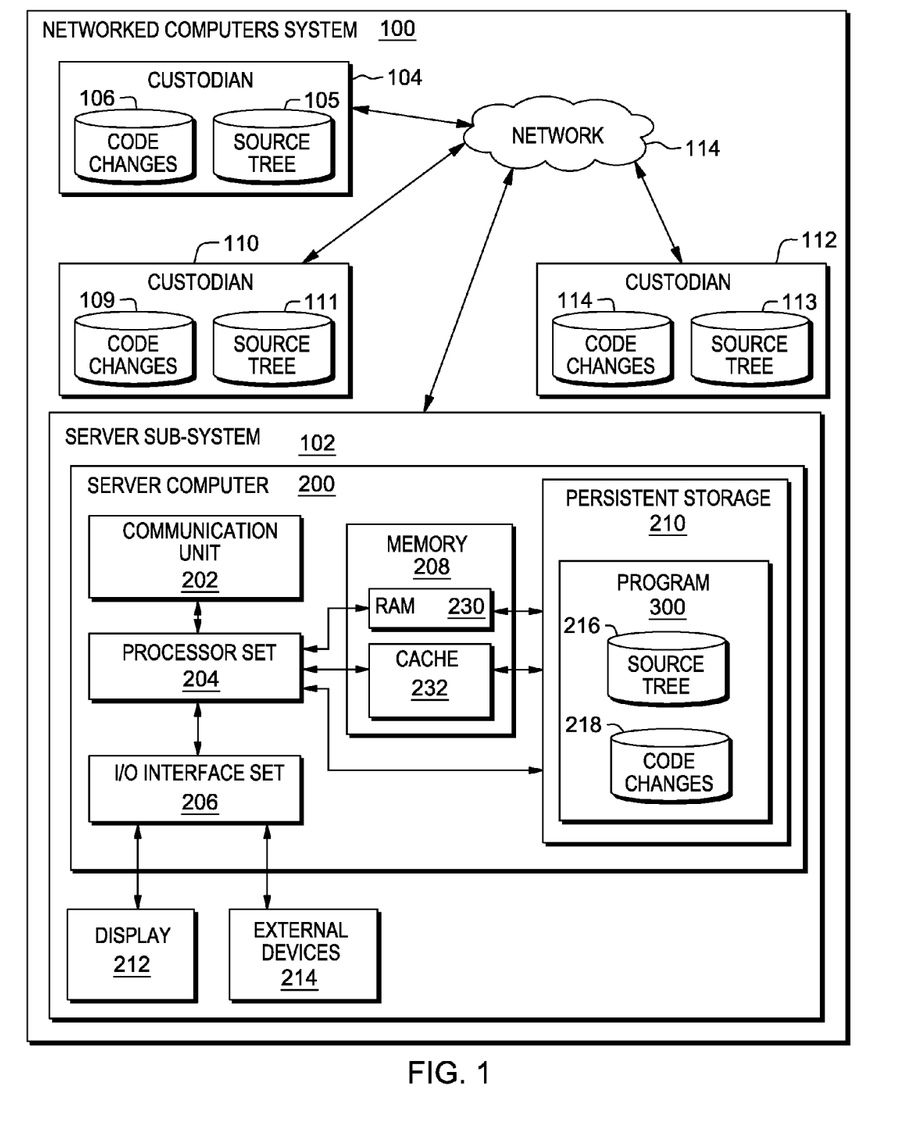
FIG. 1 is a schematic view of a first embodiment of a networked computers system according to the present invention.

An embodiment of a possible hardware and software environment for software and/or methods according to the present invention will now be described in detail with reference to the Figures. FIG. 1 is a functional block diagram illustrating various portions of a networked computers system 100, including: server sub-system 102; custodian sub-systems 104, 110, 112; communication network 114; code change history 106, 109, 114; source tree 105, 111, 113; server computer 200; communication unit 202; processor set 204; input/output (i/o) interface set 206; memory device 208; persistent storage device 210; display device 212; external device set 214; random access memory (RAM) devices 230; cache memory device 232; source tree 216; code changes 218; and program 300.

Server sub-system 102 is, in many respects, representative of the various computer sub-system(s) in the present invention. Accordingly, several portions of sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
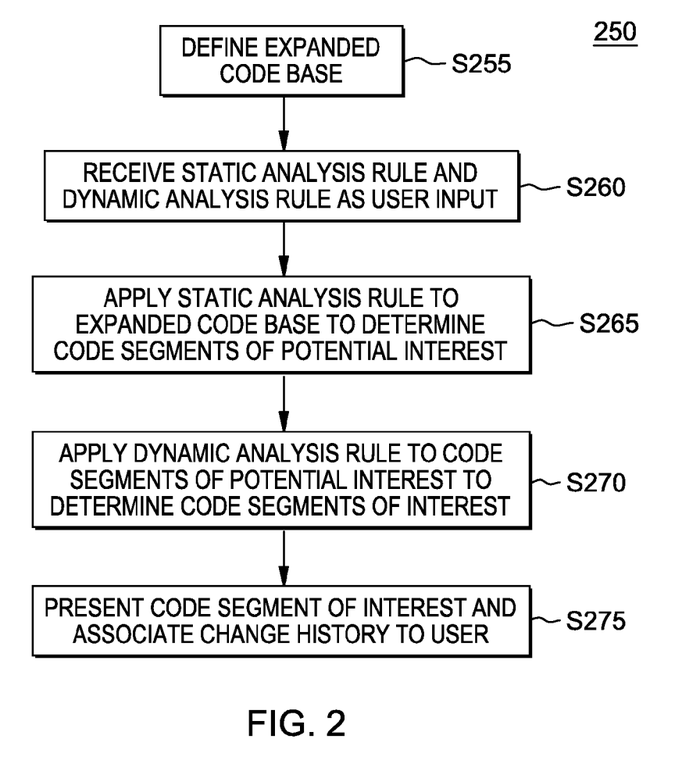
FIG. 2 is a flowchart showing a process performed, at least in part, by the first embodiment computer system.
Figure 3:
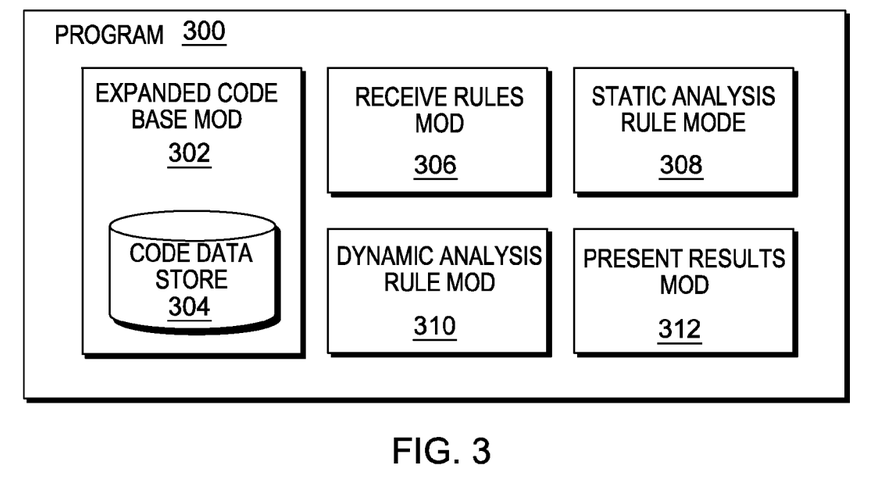
FIG. 3 is a schematic view of a software portion of the first embodiment computer system.

FIG. 2 shows a flow chart 250 depicting a method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at step S255, where expanded code base module "mod" 302 defines an expanded code base that is stored in code data store 304. In addition to all the code conventionally stored in a software developer's workspace, the expanded code base of code data store 304 includes: multiple instances of code, releases, components or projects, as well as a complete history of changes (that may be updated on a real time basis) for all of the code in the expanded code base. In this way, the expanded code base is both: (i) comprehensive; and (ii) up to date. Changes made to source trees 105, 111, 113, and 216 (FIG. 1) are recorded in corresponding change history stores 106, 109, 114, and 218 (FIG. 1).

More specifically, the software developer's server computer 200 receives through network 114 source trees 105, 111, 113 and code change histories 106, 109, 114 found on "custodian sub-systems" 104, 110, 112 (see FIG. 1, note: the custodian sub-systems are computer systems that other software developers are using to revise other pieces of code in the expanded code base, including, in this example, pieces of code that the software developer of sub-system 102 is not authorized to change). The expanded code base provides the software developer with access to change histories and example code segments that are used for reference by the developer for troubleshooting and/or development of code segments. The expanded code base is a set of code including multiple releases, or versions, of program code associated with (i) product releases; (ii) product versions; (iii) product components; (iv) program source trees; (v) code instances; (vi) code segments; and/or (vii) code projects. The contents of a given expanded code base may, at least in part, be limited by: (i) available related code segments; (ii) relationships among software developers; (iii) joint projects among software developers; and/or (iv) the extent of network access to source trees on other software developer's sub-systems, such as sub-systems 104, 110, and 112 (FIG. 1).

Processing proceeds to step S260, where receive rules module "mod" 306 receives a static analysis rule and a corresponding dynamic analysis rule from the user. In this example, a single pair of rules is provided by the user for searching the expanded code base; however, in practice, multiple pairs of rules are maintained in a rules store (not shown) and portions of the code corresponding to the various rules are indexed to the expanded code base in a code index (not shown). Code rules provide pattern indicators for use in pattern recognition. For example, the source code supporting a word processing system calls a subroutine to automatically save updates to a document. The call occurs periodically, based on a target code segment that defines the interval as 15 minutes between calls to the subroutine. The programmer wants to set the interval to 5 minutes. The programmer searches the expanded code base for related code segments by setting up the static analysis rule for this change as, for example, "locate the terms: setInterval and autosave." Further, the programmer searches the set of related code segments identified by the static analysis rule by setting up the dynamic analysis rule as the change of the parameter corresponding to the target code segment from 15 minutes to 5 minutes. Alternatively, upon saving a change to the code, receive rules mod 306 identifies the proposed change as matching a dynamic analysis rule in the rules store (not shown). In the example, the dynamic analysis rule represents the change in parameters of the target code segment. Alternatively, the dynamic analysis rule reflects other aspects of the target code segment including: (i) comments; (ii) remarks; (iii) natural language equivalents of the comments; (iv) natural language equivalents of the remarks; and/or (v) natural language equivalents of the parameters.

The static analysis rule is applied to the expanded code base to identify exact words and/or phrases within the code base. In this embodiment, related code segments located by the static analysis rule module are specified by the following: (i) location of the related code segment within the code base; and (ii) last edited date of the related code segment. Alternatively, other or additional characteristics are the basis of specifying a related code segment including: (i) code segment word count; and/or (ii) owning software developer.

The dynamic analysis rule applies to changes made to the related code segment(s) identified by the static analysis rule including: (i) code language and/or (ii) code structure. The dynamic analysis rule identifies a difference between two saved versions of a related code segment. A difference includes: (i) a change in the word(s) used; and/or (ii) no change in the word(s) used (in some cases, the software developer is seeking no change between saved versions of related code segments so that a change may be contemplated, or otherwise take notice of a "no change" condition). In this embodiment, where related code segment A and related code segment B correspond to the same portion of code in the code base, the difference identified by the dynamic analysis rule is that related code segment A has a different last edited date than related code segment B. The different last edited date does not just refer to an earlier revision, but may be: (i) an earlier last edited date; (ii) a later last edited date; or (iii) either an earlier or later last edited date. In that way, the static analysis rule may be applied to any version of the source code and the revised code segment identified by the dynamic analysis rule may be found in either an earlier or later version of the related code segment, depending, for example, on the preference of the software developer. Alternatively, the code segments have different word counts. Alternatively, the code segments are owned by different software developers.

Processing proceeds to step S265, where static analysis rule module "mod" 308 applies the static analysis rule to the expanded code base to determine code segments of potential interest. A target code segment is used by the static analysis rule to identify related code segments in the expanded code base. Related code segments identified by the static analysis rule are referred to herein as "code segments of potential interest." In this embodiment, the static analysis rule mod flags each code segment of potential interest in code data store 304. Continuing with the above example, the code segments of potential interest are the code segments that include the terms: setInterval and autosave. Alternatively, the static analysis mod applies language-aware capabilities to locate patterns in segments of the expanded code base that match the rule despite the use of different terms. For example, instead of the term "setInterval," the alternative embodiment will also determine segments of potential interest that include "setTimeout" if the other parameters in the rule are met, such as "autosave."

Processing proceeds to step S270, where dynamic analysis rule module "mod" 310 applies the dynamic analysis rule to the code segments of potential interest. In this embodiment, code segments of potential interest having revised code segments that satisfy the dynamic analysis rule are designated as code segments of interest. Alternatively, code segments of potential interest and their corresponding revised code segments satisfying the dynamic analysis rule combine to make up code segment pairs of interest. For example, a code segment pair of interest would include the code segment of potential interest, identified by the static analysis rule, and a revised code segment, identified by the dynamic analysis rule, such that the pair of code segments includes the term "setInterval" exhibit the parameter change from 15 minutes to 5 minutes.

Processing proceeds to step S275, where present results module "mod" 312 presents to the user: (i) the code segment of interest (if identified); and (ii) the associated code change history. Alternatively, the code segment pair of interest is presented to the user. Alternatively, the analysis rules for which the code segment of interest matches are presented to the user.

Figure 4A:
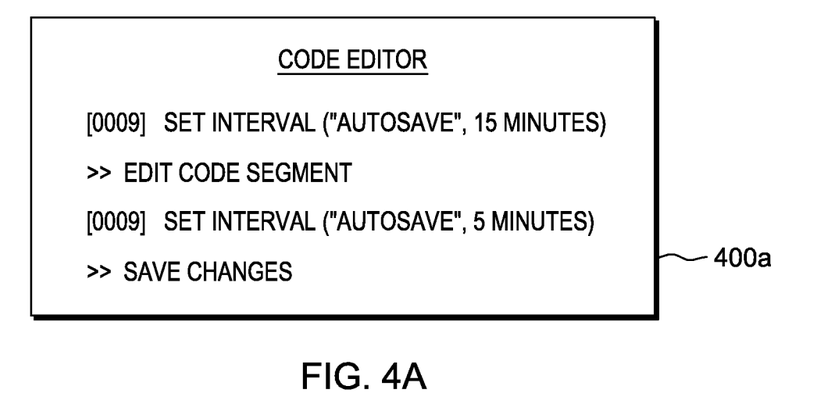
FIG. 4A is a first screenshot generated by the first embodiment computer system.

FIG. 4A is a screenshot 400a illustrating the code editor where the parameter change for setInterval is made from 15 minutes to 5 minutes, as discussed in the example above.

Figure 4B:
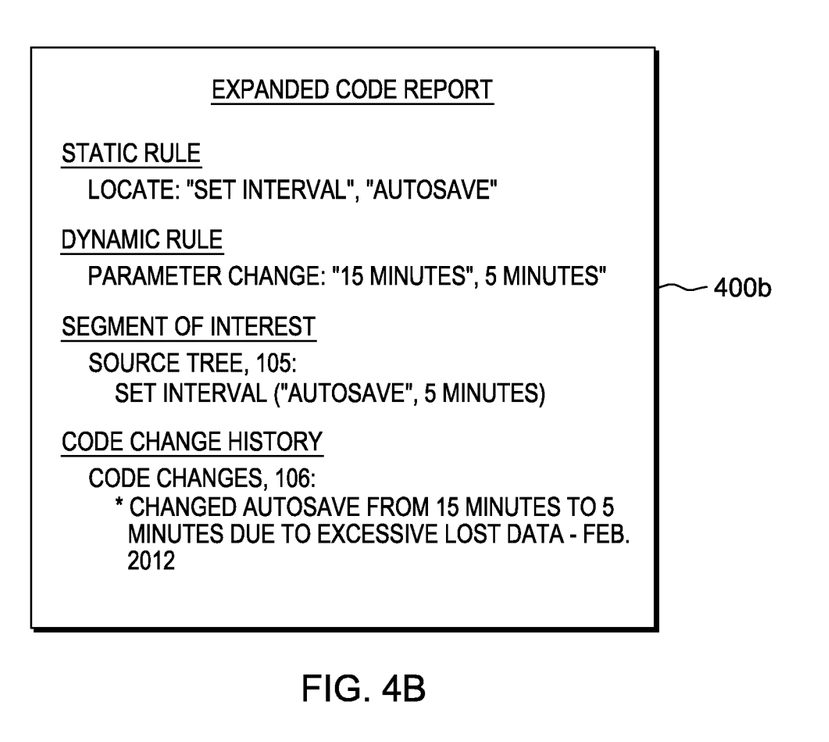
FIG. 4B is a second screenshot generated by the first embodiment computer system.

FIG. 4B is a screenshot 400b illustrating an expanded code report generated by present results mod 380 according to an embodiment of the present invention. The code report provides: (i) static analysis rule; (ii) dynamic analysis rule; (iii) recitation of the code segment(s) of interest; and (iv) code change history corresponding to the reported code segment(s) of interest. In this simple example, there is only one code segment of interest (found in source tree 105) and only one code change history record (found in code change history 106). This simple example is for illustration purposes. The expanded code set report includes an exhaustive listing of all code segments of interest within the expanded code set that are associated with a pattern matching the static and dynamic analysis rules established in step S260.

III. Further Comments and/or Embodiments

Some embodiments of the present invention recognize the following facts, potential problems and/or potential areas for improvement with respect to the current state of the art: (i) change history comments don't always include the keywords that the developer chooses as search terms when searching change repositories; (ii) static analysis rules don't identify the scenarios where a targeted code change had occurred in the past, but only places where a particular code snippet currently exists; (iii) conventional manual methods of identifying related code portions are very time-consuming, error-prone, and labor-intensive tasks; (iv) conventional manual methods provide no guarantee that the desired subset of changes will be identified; (v) when making a change or when considering a change to a pattern in existing code, a developer will find it helpful to see other places in the code base where this type of change has already been made or could also be made including: (a) other source trees for different versions of the product, and/or (b) other sections of completely unrelated code in the source tree; and/or (vi) state of the art software development tools have a difficult time in constructing static analysis rules in an automatable way for historical change applications.

Some embodiments of the present invention may include one, or more, of the following features, characteristics and/or advantages: (i) review source trees for different versions of the product where some proposed code change was, or should be, considered or made; (ii) review other sections of completely unrelated code in the source tree for the product that is planned to be subject to the proposed change; (iii) may be incorporated into an integrated development environment (IDE); (iv) may be incorporated into source code management (SCM); (v) decision support for making a change in other locations in the code base; (vi) visibility of other places in the code base where a similar change has already been made; (vii) determining the manner in which a similar change was executed at other places in the code base; (viii) viewing any additional information, such as notations, about a change made at other places in the code base; and/or (ix) visibility of where a similar change was made within the base code, but subsequently undone, reverted, or canceled.

An example demonstrating a useful application of the present disclosure follows. A developer notices a pattern of HashTables and HashMaps being converted to WeakHashMaps. In this example, this pattern emerges in very old, stable Java code. In this example, the developer questions why others were making this change, and has other software development concerns, such as: (i) reacting to environmental changes; (ii) reacting to changes in the capabilities of the Java runtime (such as, additions and modifications); and/or (iii) changing the code for performance reasons. In this example, the developer wishes to see all the places where this type of change has been made to understand whether or not such changes should be made more broadly in other places in the code base. The developer also wishes to find other places that a similar change was been made and then reverted back for a specific reason(s). This information may discourage the developer from applying the change broadly to the code base.

Some embodiments of the present disclosure may include one, or more, of the following features, characteristics and/or advantages: (i) a method for static analysis of source code changes in development environments and repositories by applying static analysis techniques across multiple versions of source code to detect the historic occurrence of specific changes of interest being made to the code; (ii) the environment can include multiple releases, multiple repositories, multiple products, etc (not just the current workspace, as with most IDEs today); (iii) a search can include contextual information, ensuring that the search results are both more refined and more complete than existing methods; (iv) the entire repository or set of repositories can be indexed out-of-band so that the search for similar changes in the repositories can be very fast; (v) because of the speed of background indexing and searching, a developer is notified in real-time of relevant information, while in the process of making a change, not after the change has already been made and substantial effort already expended; (vi) implementations of the disclosure may involve static analysis rules coupled with SCM historic data; (vii) static analysis rules that are specific to certain language constructs; and/or (viii) static analysis rules that are specific to certain source code constructs.

Examples of patterns determined by various static analysis rules applied to SCM history include: (i) variables in Java files changed from BigDecimal to Long; (ii) variables in Java files changes from HashMap to WeakHashMap; (iii) threshold values changed from 10 seconds to 60 seconds; (iv) default values changed from 10 seconds to 60 seconds; (v) certain types of values were changed between release 5 and release 6; and/or (vi) certain types of values were changed between product X and product Y.

Some embodiments of the present disclosure establish a baseline of change sets, using a language-aware difference system (such as Eclipse's Java awareness). (Note: the term(s) "ECLIPSE," and/or "JAVA" may be subject to trademark rights in various jurisdictions throughout the world and are used here only in reference to the products or services properly denominated by the marks to the extent that such trademark rights may exist.) There is a range of potential change patterns including: (i) changing from one data type to another; and (ii) changing from one operator to another. The more change patterns that can be recognized by the language-aware system, the more powerful the implementation.

For example, in the case of extremely simple changes, such as a change from "&&" to "||", the language-aware system would have to extend the simple change pattern to include more data (such as the types that are being compared, not just the operator change). Further, large, complex changes would likely generate multiple change patterns.

Some embodiments of the present disclosure may further include one, or more, of the following features, characteristics and/or advantages: (i) a background process that indexes the changes that are made; (ii) a background process that stores change patterns in a repository that can be easily indexed and quickly searched; (iii) a proactive system that notifies the user when the system recognizes that a change is being made and searches the repository for similar changes; (iv) change patterns that are recognized across different instances of the base code; (v) change patterns that are recognized over history of the life of a given class; (vi) change patterns that are recognized over multiple releases; (vii) change patterns that are recognized over multiple components; (viii) change patterns that are recognized over multiple projects; (ix) change patterns that are recognized across various snapshots of the code base; (x) the disclosed system may be triggered explicitly by the user (for example: the user clicks on a particular object or variable to view the history of its changes and any related types of changes in other places within the code base); and/or (xi) the user may click on a particular data type or class type and view the history of transformations on that selected type.

Some embodiments of the present disclosure may further include one, or more, of the following features, characteristics and/or advantages: (i) applicable to any programming language (that is, Java, C++, C, COBOL, etc.); (ii) extends to other types of documents, not just code changes (for example, in a pharmaceutical community, changes to chemical compounds used in an experiment may be analyzed using appropriate terms and rules for that industry); (iii) extends to perform operations upon the results of the analysis (for example, making uniform updates, performing transformations, and/or creating reports); (iv) allows for a user to actively request the history of an object by clicking on the object or range to view the history of the object (including any past refactoring of code and so forth) in a given file; (v) allows for a user to actively request the history of an object by clicking on the object or range to view the history of the object (including any past refactoring of code and so forth) in the entire repository; (vi) allows for a user to actively scope a request for the history of an object by clicking on the object or range to view the history of the object (including any past refactoring of code and so forth) in a given file; and/or (vii) allows for a user to actively scope a request for the history of an object by clicking on the object or range to view the history of the object (including any past refactoring of code and so forth) in the entire repository.

Some embodiments of the present disclosure may further include one, or more, of the following features, characteristics and/or advantages: (i) allow for a project-wide query (for example, a user clicks on a project to view a history of particular types of objects, such as WeakHashMap, in the project); (ii) allow for a project-wide query (for example, a user clicks on a project to view a history of objects (for example, when and why a change was made from HashMap or HashTable based on change histories); (iii) change analysis implemented in code review tools to identify whether a particular change is a good change to make; (iv) identify where else within the code base and/or repository a selected type of change was made; (v) learn to extrapolate where else a change might apply when a change is being made, that is, anticipates future issues; (vi) in complex change sets, search for changes that had similar sets of changes (such as 70% similarity) to identify locations that were not changed, but likely should have been made; (vii) provide for user to scope the analysis set (for example, a subset of files, a set of releases, and/or a set of versions); (viii) do more than specify rules to observe changes made at multiple regions in a source code; (ix) do more than notify the user of changes made across multiple instances of the source code; (x) provide more than a subscription-based notification set related to moment-in-time changes in certain documents; (xi) allow for analysis of historical document changes (for example, identifying places in a code base having been modified over the course of ten years); (xii) provide for storage and analysis of specific change histories; and/or (xiii) provide for the application of rules related to changes in a given code base or code repository that is more than just text or natural language based, and requires programming language syntax awareness (for example, where a variable was changed from an integer type to a character string type).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Code set: and collection of program code, whether organized for execution as a program or stored in a repository of program code.

What is claimed is:

1. A method comprising:
receiving a static analysis rule and a corresponding dynamic analysis rule associated with a first proposed code change to a first code segment;
applying the static analysis rule to a code set to identify a set of code segments of potential interest; and
applying the dynamic analysis rule to code segments within the identified set of code segments of potential interest to determine an identity of a set of code segments of interest that are related to the first code segment with respect to the advisability of making the first proposed code change in a member of the group consisting of: (i) the first code segment, and (ii) at least one of the code segments of potential interest;
wherein:
the static analysis rule includes a code snippet for matching with code segments within the code set to identify the set of code segments of potential interest; and
the dynamic analysis rule includes target change data to determine related code segments within the identified set of code segments of potential interest, the related code segments forming, at least in part, the set of code segments of interest.

2. The method of claim 1 further comprising:
determining the static analysis rule and the corresponding dynamic analysis rule, based, at least in part, upon the first proposed code change.

3. The method of claim 2 wherein the determining the static analysis rule and the corresponding dynamic analysis rule is performed using programming language syntax awareness.

4. The method of claim 2 wherein the static analysis rule and the corresponding dynamic analysis rule are selected from a set of code rules.

5. The method of claim 1 further comprising:
presenting the identity of the code segments of interest and respectively corresponding change history in human readable form and format.

6. The method of claim 5 wherein the presenting is performed automatically and in real time.

7. The method of claim 1 further comprising:
proposing a second proposed code change to a code segment of potential interest automatically and without substantial human intervention based, at least in part, upon the advisability of making the first proposed code change.

8. The method of claim 1 further comprising:
indexing the identity of the code segments of interest and their respectively corresponding change history.

9. A computer program product comprising a non-transitory computer readable storage medium having stored thereon:

first program instructions programmed to receive a static analysis rule and a corresponding dynamic analysis rule associated with a first proposed code change to a first code segment;

second program instructions programmed to apply the static analysis rule to a code set to identify a set of code segments of potential interest; and third program instructions programmed to apply the dynamic analysis rule to code segments within the identified set of code segments of potential interest to determine an identity of a set of code segments of interest that are related to the first code segment with respect to the advisability of making the first proposed code change in a member of the group consisting of: (i) the first code segment, and (ii) at least one of the code segments of potential interest;

wherein:

the static analysis rule includes a code snippet for matching with code segments within the code set to identify the set of code segments of potential interest; and the dynamic analysis rule includes target change data to determine related code segments within the identified set of code segments of potential interest, the related code segments forming, at least in part, the set of code segments of interest.

10. The computer program product of claim 9 further comprising the non-transitory computer readable storage medium having stored thereon:

fourth program instructions programmed to determine the static analysis rule and the corresponding dynamic analysis rule, based, at least in part, upon the first proposed code change.

11. The computer program product of claim 10 wherein determining the static analysis rule and the corresponding dynamic analysis rule is performed using programming language syntax awareness.

12. The computer program product of claim 10 wherein the static analysis rule and the corresponding dynamic analysis rule are selected from a set of code rules.

13. The computer program product of claim 9 further comprising the non-transitory computer readable storage medium having stored thereon:

fourth program instructions programmed to present the identity of the code segments of interest and respectively corresponding change history in human readable form and format.

14. The computer program product of claim 13 wherein presenting the identity of the code segments of interest is performed automatically and in real time.

15. A computer system comprising:
a hardware processor set; and
a computer readable storage medium;
wherein:

the hardware processor set is structured, located, connected and/or programmed to run program instructions stored on the computer readable storage medium; and the program instructions include:

first program instructions programmed to receive a static analysis rule and a corresponding dynamic analysis rule associated with a first proposed code change to a first code segment;

second program instructions programmed to apply the static analysis rule to a code set to identify a set of code segments of potential interest; and third program instructions programmed to apply the dynamic analysis rule to code segments within the identified set of code segments of potential interest to determine an identity of a set of code segments of interest that are related to the first code segment with respect to the advisability of making the first proposed code change in a member of the group consisting of: (i) the first code segment, and (ii) at least one of the code segments of potential interest;

wherein:

the static analysis rule includes a code snippet for matching with code segments within the code set to identify the set of code segments of potential interest; and the dynamic analysis rule includes target change data to determine related code segments within the identified set of code segments of potential interest, the related code segments forming, at least in part, the set of code segments of interest.

16. The computer system of claim 15 wherein the program instructions further include:

fourth program instructions programmed to determine the static analysis rule and the corresponding dynamic analysis rule, based, at least in part, upon the first proposed code change.

17. The computer system of claim 16 wherein determining the static analysis rule and the corresponding dynamic analysis rule is performed using programming language syntax awareness.

18. The computer system of claim 16 wherein the static analysis rule and the corresponding dynamic analysis rule are selected from a set of code rules.

19. The computer system of claim 15 wherein the program instructions further include:

fourth program instructions programmed to present the identity of the code segments of interest and respectively corresponding change history in human readable form and format.

20. The computer system of claim 19 wherein presenting the identity of the code segments of interest is performed automatically and in real time.

* * * * *